March 4, 1952 R. C. VORDERSTRASSE 2,588,062
ELECTRODE ARRANGEMENT FOR FENCE WELDING MACHINES
Filed April 6, 1948 2 SHEETS—SHEET 1

Inventor
RUDOLPH C. VORDERSTRASSE

March 4, 1952 R. C. VORDERSTRASSE 2,588,062
ELECTRODE ARRANGEMENT FOR FENCE WELDING MACHINES
Filed April 6, 1948 2 SHEETS—SHEET 2
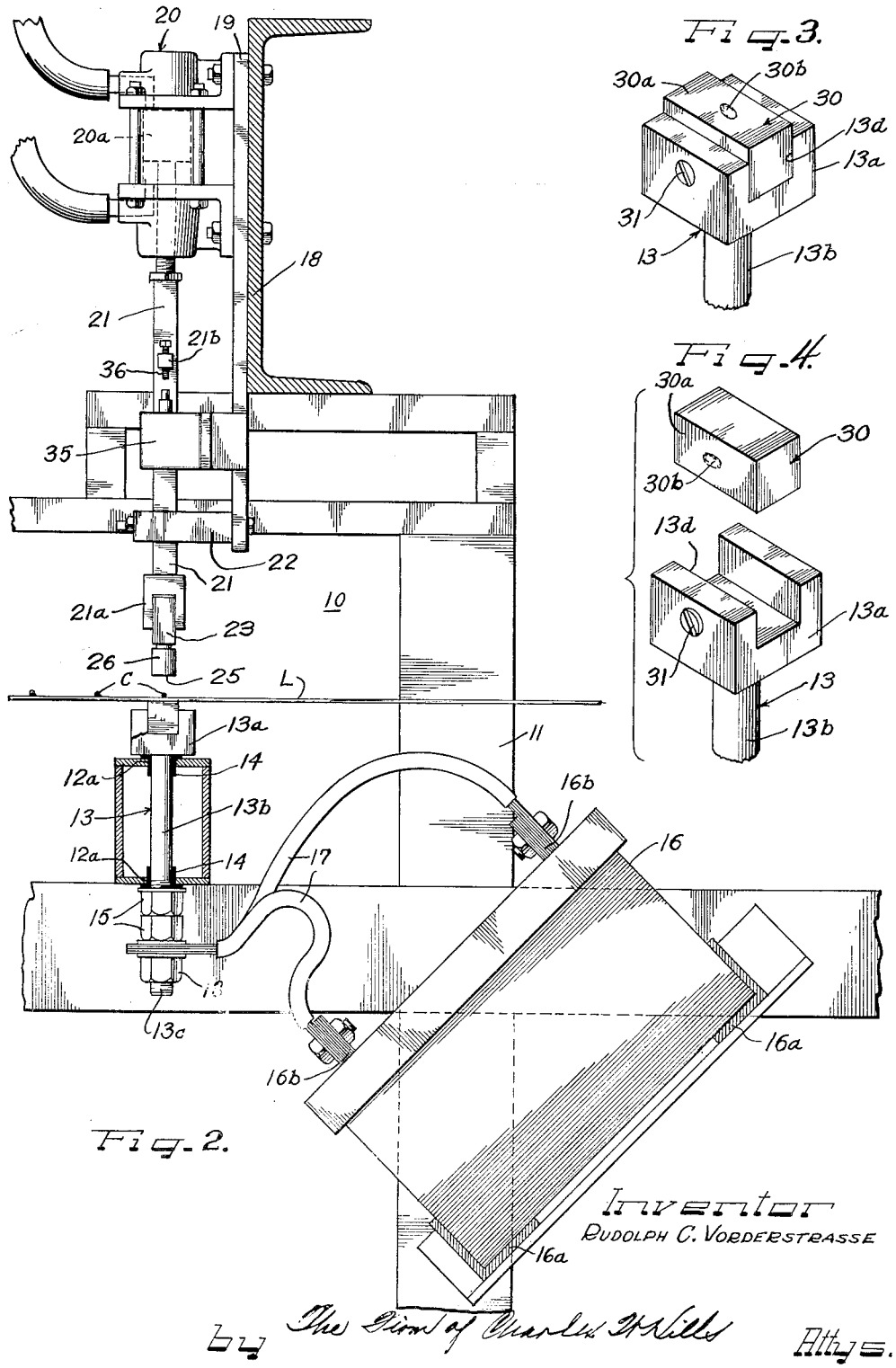
Inventor
RUDOLPH C. VORDERSTRASSE
by The Firm of Charles W. Mills
Attys.

Patented Mar. 4, 1952

2,588,062

UNITED STATES PATENT OFFICE 2,588,062

ELECTRODE ARRANGEMENT FOR FENCE WELDING MACHINES

Rudolph C. Vorderstrasse, Sterling, Ill., assignor to Northwestern Steel and Wire Company, Sterling, Ill., a corporation of Illinois Application April 6, 1948, Serial No. 19,283

2 Claims. (Cl. 219—4)

This invention relates to a machine, for concurrently welding a plurality of workpiece junctures, and particularly to an improved welding electrode arrangement for a fence welding machine.

Machines for concurrently producing a plurality of welds have been heretofore known and utilized, particularly in the art of fence making. In existing fence making machines, a plurality of line wires are drawn through the machines in spaced relationship and cross wires are successively positioned on such line wires and welds effected at the junctures of the cross wire with each of the line wires. In machines heretofore known, such welds were accomplished by a plurality of pairs of relatively movable electrodes and all of such pairs of electrodes were concurrently energized in parallel from one or more suitable sources of welding current. Since a substantial relative movement of the cooperating electrodes must be provided in order to permit the completed fence portion to be pulled away from the electrodes and a new cross wire to be inserted on the line wires for the next welding operation, it has been necessary to employ current supply leads to the movable electrode of each cooperating pair of relatively flexible construction so as to exert a minimum restraining influence upon the necessary movements of such electrode. Such flexible conductor construction, coupled with the substantially continuous oscillating movements of the movable electrode at cyclic rates in the range of two movement cycles per second, necessarily required a high quality flexible connection which was subject to rapid fatigue deterioration, thus requiring repeated replacement and repair of such flexible conductors. Obviously, any form of replacement or repair on a machine of this character necessarily requires the entire machine to be shut down and the production cost of the fence making operation is substantially adversely affected.

Still another limitation of existing welding machines lies in the fact that the surfaces of the electrodes which contact the workpieces to be welded are subject to relatively rapid deterioration due to the arcing necessarily involved in the welding operation. Since such electrodes are preferably formed of high quality metal of good electrically conducting properties, the rapid deterioration of such electrodes constitutes an item of substantial expense in addition to the loss of production time required for replacement of the deteriorated electrodes. Furthermore, as is well known a maximum life of welding electrodes may be achieved only when the temperatures attained by such electrodes during the successive welding operations is maintained at a minimum. While this problem may be satisfactorily solved by fluid cooling arrangements in a simple machine involving only a pair of welding electrodes, the problem becomes very substantial in multiple welding machines, such as fence welding machines, wherein the total number of pairs of electrodes to be cooled may be on the order of thirty or more. The application of conventional cooling arrangements to such a large number of electrodes which are necessarily disposed in closely spaced relationship would obviously greatly complicate the construction of any multiple weld machine.

Accordingly, it is an object of this invention to provide an improved machine and method for effecting multiple welds.

A further object of this invention is to provide an improved fence welding machine for concurrently effecting a satisfactory weld at each of the junctures of a cross wire with a plurality of line wires.

Still another object of this invention is to provide an improved electrode arrangement for fence making or similar multiple weld machines characterized by the elimination of all electrical connections to the movable electrode of the machine and permitting the use of relatively rigid electrical connections to non-movable cooperating electrodes; thus the connections are not flexed or shifted during the operation of the machine, hence eliminating deterioration of such connections and the need for replacement or repairs.

A further object of this invention is to provide an improved method for effecting multiple welds wherein a plurality of workpiece junctures are concurrently welded by the flow of a single welding current in series circuit relationship through such junctures.

Still another object of this invention is to provide an improved fluid cooling arrangement for multiple electrode welding machines wherein a single fluid conducting element is employed to direct cooling fluid in heat transfer relationship to a plurality of welding electrodes and such element is of stationary construction and requires only a single inlet and a single outlet connection for fluid circulation purposes.

A particular object of this invention is to provide an improved assemblage of an electrode contact block in an electrode support by which a plurality of faces of the contact block may be successively employed as welding electrode surfaces.

The specific nature of this invention as well as other objects and advantages thereof will become apparent to those skilled in the art from the following detailed description of the annexed sheets of drawings which, by way of preferred example only, illustrate one specific embodiment of the invention.

On the drawings:

Figure 2 is a vertical sectional view, taken on the plane II—II of Fig. 1;

Figure 3 is an enlarged scale, perspective view of a fixed electrode assemblage embodying this invention; and Figure 4 is an exploded view of the electrode assemblage of Fig. 3 illustrating the manner in which utilization of a plurality of contact faces of the contact block may be obtained.

As shown on the drawings:

Figure 1:
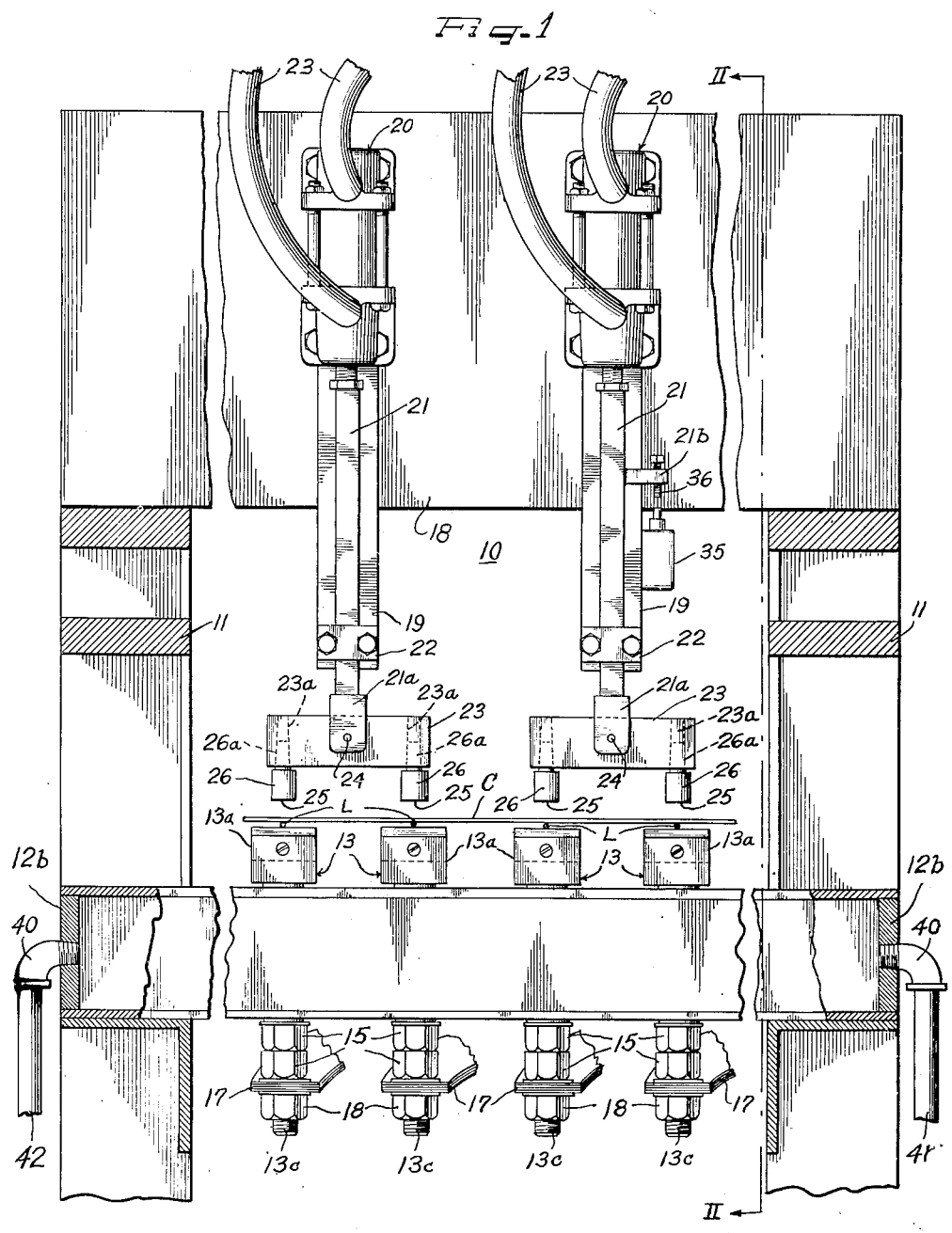
Figure 1 is a front elevational view, partly in section, of a portion of a fence welding machine embodying the electrode structure of this invention.

Referring to the drawings, there is shown a fence welding machine having an electrode structure constructed in accordance with this invention. For clarity of illustration, the conventional operating mechanisms of such machine, such as the mechanism for feeding the line wires L through the machine and for successively positioning cross wires C in transverse abutting relationship to the line wires L, have not been shown and will be understood to be entirely conventional. The machine 10 embodies a frame structure including spaced vertical side frames 11 and between such side frames a hollow box-like frame member 12 is mounted, extending across the full width of the machine, and underlying each of the spaced line wires L at the location where the cross wires C are successively positioned prior to the welding operation. As is best shown in Fig. 2, the hollow frame 12 may be of rectangular cross section and formed by welded assemblage of plate-like members.

A plurality of electrode supports 13 are provided corresponding in number to the maximum number of line wires for which the machine is designed to accommodate. Each electrode support element 13 comprises a block-like head portion 13a, which will be described in more detail later and a rod-like supporting portion 13b which is integrally formed with, or suitably secured to the head portion 13a in good heat and electrically conducting relationship. The electrode supports 13 are mounted in spaced relationship along the hollow frame 12 by virture of having their rod-like support portions 13b project through suitable aligned apertures 12a in the top and bottom plates of the hollow frame 12. Insulating washers 14 are provided intermediate the frame 12 and the support rod 13b so that each of the electrode supports 13 are electrically insulated from each other, and from the hollow frame 12. The bottom end of the support rod portion 13b projects through hollow frame 12 and is threaded as indicated at 13c and nuts 15 are provided cooperating with such threaded portions to lock the support member 13 in assembled position on the hollow frame 12.

The top face of the head portion 13a of each of the electrode supports 13 is suitably recessed as indicated at 13d so as to accommodate a contact block 30 therein in any one of a plurality of angularly displaced positions. A set screw 31 retains the block 30 in such inserted position. While the block 30 is specifically illustrated as being of rectangular configuration and having a square cross section, so that the recess 13d is of rectangular channel shape, it should be understood that this is merely a preferred construction and that in the general case, the contact block 30 may comprise any polyhedral member which is symmetrically formed about one axis and the recess 13d will be correspondingly shaped so as to selectively receive the polyhedral block in any one of a plurality of angularly displaced positions, thereby permitting the various polyhedral faces of the block to be successively exposed.

A plurality of welding transformers 16, or any other suitable source of welding current, are stationarily mounted on the machine 10, for example, as by being supported by a pair of transversely extending angle members 16a which are welded or otherwise rigidly secured to the side frame members of the machine 10. While heretofore it has been necessary to provide a welding transformer for each pair of welding electrodes, the application of the method of this invention permits the number of welding transformers required to be reduced by one-half. Hence, a welding transformer 16 is provided only for each pair of fixed electrode supports 13 and each individual transformer 16 concurrently effects two welds in a manner that will be described in more detail later.

In any event, each of the transformers 16 is provided with a pair of output terminals 16b and such output terminals are respectively connected to two adjacent electrode supports 13 as by having connecting leads 17 bolted at one end to a transformer terminal 16b and at their other end bolted to the threaded portion 13c of the electrode support and secured thereon by a nut 18. It is to be particularly noted that the conductors 17 need not be of the flexible type heretofore required in welding machines employing relatively movable electrodes but may, if desired, be of completely rigid construction since there is no movement of the electrode support 13 relative to the transformers 16 during the normal operation of the machine.

To provide support for the movable electrodes of the machine, a mounting plate 18 is provided extending transversely across the top portions of the machine and being suitably supported by the side frames members 11. For example, the mounting plate 18 may constitute the web portion of a transversely extending channel beam.

In spaced relationship along mounting plate 18 a plurality of vertically extending sub plates 19 are mounted and a hydraulic cylinder unit 20 is vertically mounted on each sub plate, there being a cylinder unit for each pair of electrode supports 13 and each of such cylinder units being preferably mounted in a medial position with respect to the corresponding pair of electrode supports 13. The piston 20a, or equivalent movable part of the hydraulic cylinder 20, is suitably connected to an actuating bar 21 which is guided for vertical reciprocating movements by a bracket 22 which is secured adjacent the bottom end of each of the sub plates 19. Pressured fluid for effecting the operation of the hydraulic cylinder units 20 is supplied to each cylinder unit through hose connections 23. While such connections may constitute an ordinary rubber hose member, it is to be noted that no flexing of such connections will occur during the normal operation of the machine and hence such hoses will not be subject to the deterioration which normally accompanies repeated cyclic movements.

The bottom end of actuating bar 21 is bifurcated as indicated at 21a and an electrode support bar 23 is medially pivoted in such bifurcated portion by a transverse pin 24. A pair of spaced welding contact surfaces 25 are then defined in any suitable manner on opposite ends of the electrode support bar 23 and are suitably spaced so as to respectively overlie two adjacent electrode supports 13 which are connected to the same transformer 16. In addition, the contact surfaces 25 are so positioned lengthwise of the machine so that they will respectively overlie two junctures of a positioned cross wire C with the line wires L. Hence, each pair of contact surfaces on the electrode support bar 23 is capable of clamping a pair of junctures of the line wires L and cross wire C against the aligned pair of electrode supports 13. For convenience in replacement, as well as to facilitate the maintenance of a good electrical contact, the contact surfaces 25 may be defined by the end faces of plug members 26 of copper or similar good electrically conducting material which have tapered shank portions 26a which are respectively snugly insertable in correspondingly tapered holes 23a provided in opposite ends of the electrode support bar 23. A low resistance electrical connection is provided between each pair of electrode plugs 26 and such connection may be most conveniently provided by forming the electrode support bar 23 of good electrically conducting material.

From the foregoing description, it is apparent that when any one of the hydraulic cylinder units 20 is energized to produce a downward movement of the electrode support bar 23 associated therewith, an adjacent pair of junctures of the cross wire C with the line wires L will be concurrently respectively clamped between the opposed electrode plugs 26 and the contact blocks 30 associated with the electrode supports 13 which underlies the particular juncture. The pivoted mounting of the electrode support bar 23 with respect to the actuating members 21 permits the electrode structure to adjust itself to slight variations in the thickness of the juncture formed by the cross wires and line wires. Hence, even though one juncture may be of somewhat greater thickness than the other, both junctures will be securely clamped between the corresponding contact plugs 26 and contact blocks 30 so that a proper weld may be produced. Then the subsequent energization of the source of welding current associated with the particular pair of electrode supports 13, in this example, the transformer 16, will produce a series circuit flow of welding current through one of the workpiece junctures, thence through the electrode support bar 23, and through the other workpiece juncture back to the source of welding current. Hence a pair of welds may be accomplished by a single circuit flow of welding current.

In the normal operation of the machine, all of the hydraulic cylinder units 20 are concurrently energized to move their cooperating electrode support bars 23 and contact surfaces 25 into engagement with the corresponding junctures of the line wires L and the cross wire C. Likewise, the various source or sources of welding current are concurrently energized to produce flow of welding current through all of the series connected welding junctures. While any suitable form of electrical and hydraulic control may be employed to accomplish such correlated functions, I preferably employ the control system described and illustrated in the copending application of Harry Griesmer, Serial No. 37,644, now Patent No. 2,497,260, filed concurrently herewith and assigned to the assignee of this application. As is described in more detail in the above identified Griesmer application, the initiation of flow of welding current is controlled by the actuation of a limit switch in response to the movement of the movable electrodes to their welding position with respect to the fixed electrodes. Such limit switch may comprise the switch element 35 which is mounted on the side of one of the sub plates 19 and is actuated by downward movement of the actuating member 21 through an adjustable contact screw 36 carried in a laterally projecting arm 21b formed on the actuating member 21.

In accordance with this invention, the hollow frame member 12 is also utilized to effect a fluid cooling of each of the electrode supports 13. This may be conveniently accomplished by providing closure plugs 12b in each end of the hollow frame 12 into which are threaded suitable fittings 40 which communicate with inlet and outlet pipes 41 and 42 respectively of a circulating fluid cooling system. The rod-like support portion 13b of each of the electrode supports 13 is thus disposed in intimate heat conducting relationship with the cooling fluid circulated through the hollow frame 12 and hence, effective cooling of the contact blocks 30, as well as the contact plugs 26 of the movable electrodes is accomplished. Due to the low voltages involved, water may be conveniently employed as the cooling fluid, but, of course, it may sometimes be desirable to employ a cooling fluid having electrically insulating properties, such as a suitable oil.

The utilization of a separate contact block 30 in each of the electrode supports 13 provides additional advantages in maintaining the shut down time of the machine due to normal deterioration effects at a minimum. As is best shown in Figure 3, the exposed surface 30a of the contact block 30 deteriorates in relatively short time under the adverse effects of the repeated welds accomplished thereby so as to form surface irregularities thereon such as indicated at 30b. Such irregularities generally constitute a pocket having a very rough surface, although under some conditions the contact surface may have projections formed thereon as a result of the repeated welds and the accompanying sparking. In any event, a degree of surface irregularity is reduced so that the quality of further welds is substantially impaired.

In electrode constructions heretofore employed, it was generally necessary to replace the entire electrode element in order to overcome the effects of deterioration of the contact surface thereof. Through the employment of the contact blocks of symmetrical, polyhedral configuration, so that the block may be selectively mounted in the recess 13d of the electrode supports 13 in any one of a plurality of positions, exposing a different polyhedral surface of the block in each of the various positions, it is apparent that a much greater welding life may be obtained from a single contact block than has been heretofore possible. Furthermore, the time required to remove a deteriorated electrode contact surface and replace such by a new surface has been substantially reduced. As illustrated in Fig. 4 such replacement may be conveniently accomplished merely by loosening the set screw 31, withdrawing the contact block 30, angularly shifting the block 30, reinserting it in the recess 13d, and retightening the set screw 31.

The advantages of an electrode structure embodying this invention both in simplicity of construction and in improvement of function should be obvious from the foregoing description. It should be particularly noted that the described construction completely eliminates the necessity for flexible conductors for applying the welding current to the relatively movable electrodes. The concurrent energization of a pair of workpiece junctures by a series flow of welding current effects very substantial economies in the amount of electrical apparatus required. The described cooling arrangement effects the efficient cooling of all of the electrodes and may accommodate any desired number of electrodes without additionally complicating the machine. Finally, the described arrangement of the detachable contact block cooperating with the recessed electrode support permits maximum utilization of the relatively expensive contact material and maintains at a minimum the time required for replacement of deteriorated electrode surfaces.

It will, of course, be understood that various details of construction and procedure may be modified through a wide range without departing from the principles of this invention and it is, therefore, not the purpose to limit the patent granted hereon otherwise than necessitated by the scope of the appended claims.

I claim as my invention:

1. A machine for concurrently making multiple welds comprising a frame, a hollow support beam mounted thereon, a plurality of electrode supports extending vertically through said beam and insulated therefrom and sealed to the upper and lower sides of said beam in fluid-tight relation with respect thereto, means for conducting cooling fluid for circulation through the hollow interior of said beam, means on the lower ends of said electrode supports engaging the underside of said beam for securing said supports to said beam, recessed electrode retaining means on the upper ends of said supports, contact blocks detachably mounted therein and forming fixed electrodes, a source of welding current, and conductor means connected to the lower ends of said electrode supports and connecting said fixed electrodes to said source of welding current, a second pair of electrodes mounted on said frame and guided for vertical movement with respect thereto and for cooperation with said first pair of electrodes, a low resistance connection between said second pair of electrodes, and means for concurrently moving said second pair of electrodes respectively into welding position with respect to said first pair of electrodes to clamp the workpiece juncture between each opposed set of electrodes, whereby a pair of welds may be accomplished by a series flow of welding current through the opposed sets of electrodes.

2. A machine for concurrently making multiple welds comprising a frame, a hollow support beam extending horizontally thereacross, a pair of electrode supports extending vertically therethrough from one end thereof to the other and extending upwardly and downwardly therefrom, means insulating said supports from said beam and sealing said supports in fluid tight relation with respect to said beam, means conducting fluid to and from said beam, for the circulation of fluid through the hollow interior thereof, means threaded on the lower ends of said electrode supports, for securing said supports to said beam, said supports having recessed retaining means on their upper ends having contact blocks detachably mounted therein, and forming fixed electrodes, means conducting current to the lower ends of said electrode supports and to said fixed electrodes, a transversely pivoted electrode support bar, movable electrodes mounted on said bar for cooperation with said first electrodes, a fluid pressure cylinder, an actuating member movable by said cylinder toward and away from said fixed electrodes and having said support bar pivotally connected to the lower end thereof, intermediate said second electrodes, whereby a plurality of pairs of workpieces may be respectively concurrently clamped between said fixed electrodes and said contact blocks, for the concurrent welding thereof.

RUDOLPH C. VORDERSTRASSE.

REFERENCES CITED

The following references are of record in the file of this patent:

UNITED STATES PATENTS

| Number | Name | Date |
| --- | --- | --- |
| 837,249 | Perry | Nov. 27, 1906 |
| 1,046,639 | Pierce | Dec. 10, 1912 |
| 1,269,617 | Ledwinka | July 18, 1918 |
| 1,435,994 | Taylor | Nov. 21, 1922 |
| 1,996,901 | Burns | Apr. 9, 1935 |
| 2,033,616 | Fassler | Mar. 10, 1936 |
| 2,158,229 | Goldthwaite | May 16, 1939 |
| 2,349,095 | Gillum et al. | May 23, 1944 |
| 2,389,324 | Pedley | Nov. 20, 1945 |
| 2,422,829 | Fotie | June 24, 1947 |